(12) United States Patent
Zhang

(10) Patent No.: US 8,564,734 B2
(45) Date of Patent: Oct. 22, 2013

(54) RESILIENT ENGAGING MEMBER AND LIQUID CRYSTAL DISPLAY MODULE HAVING THE SAME

(75) Inventor: Tian Zhang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 348 days.

(21) Appl. No.: 12/997,490

(22) PCT Filed: Nov. 23, 2010

(86) PCT No.: PCT/CN2010/079028
§ 371 (c)(1),
(2), (4) Date: Dec. 10, 2010

(87) PCT Pub. No.: WO2012/012991
PCT Pub. Date: Feb. 2, 2012

(65) Prior Publication Data
US 2012/0026422 A1    Feb. 2, 2012

(30) Foreign Application Priority Data
Jul. 30, 2010  (CN) .......................... 2010 1 0245694

(51) Int. Cl.
*G02F 1/1333*       (2006.01)
(52) U.S. Cl.
USPC .............................................. 349/60; 349/58
(58) Field of Classification Search
USPC ..................................................... 349/58, 60
See application file for complete search history.

(56) References Cited

U.S. PATENT DOCUMENTS

2008/0129921 A1*  6/2008  Huang et al. ..................... 349/60

FOREIGN PATENT DOCUMENTS

| CN | 1465869 A | 1/2004 |
| CN | 1641231 A | 7/2005 |
| CN | 1834478 A | 9/2006 |
| CN | 201314496 Y | 9/2009 |
| DE | 3511070 A1 | 10/1985 |
| JP | 08219128 A | * 8/1996 |
| JP | 8219128 A | 8/1996 |
| JP | 2007003604 A | 1/2007 |
| JP | 2007293104 A | 11/2007 |

* cited by examiner

*Primary Examiner* — Nathanael R Briggs
(74) *Attorney, Agent, or Firm* — Ditthavong Mori & Steiner, P.C.

(57) ABSTRACT

The present invention discloses a resilient engaging member and a liquid crystal display (LCD) module having the same. The resilient engaging member comprises a leaf spring and a post. The leaf spring comprises connecting portions used to fix the leaf spring and stopping portions for engagement with the post. The post comprises a body used to fix the post and a mating portion for fixed engagement with the stopping portions. The LCD module includes a back plate, a panel, and a front frame installed in sequence, and a plurality of the resilient engaging members disposed between the back plate and the front frame and configured for connection therebetween. The resilient engaging member of the present invention has advantages of reliable connection, easy assembly, and fine resistance to any impact, etc. The LCD module adopting the resilient engaging member can significantly get rid of use of buffering material to reduce thickness of the module, and comply with the technical development trend of downsizing LCD television sets.

9 Claims, 9 Drawing Sheets

RESILIENT ENGAGING MEMBER AND LIQUID CRYSTAL DISPLAY MODULE HAVING THE SAME

BACKGROUND OF THE INVENTION

1. Field of the Invention

The present invention relates to a resilient engaging member and a liquid crystal display (LCD) module having the resilient engaging member, which falls within the technical field of flat panel display technology.

2. Related Art

A liquid crystal display (LCD) module is an assembly of a liquid crystal panel and a backlight module. During a manufacturing process of LCD television sets, the liquid crystal panel and the backlight module are assembled together to form a whole unit. However, the liquid crystal panel and the backlight module work independently from each other (i.e., unrelated operating circuits).

FIG. 1 is a schematic structurally exploded view of a conventionally typical liquid crystal display (LCD) module. The LCD module essentially comprises a back plate 10, a reflection sheet 20, backlight tubes 30, an optical film 40, a panel 50, and a front frame 60. When the LCD module is assembled, the back plate 10, the reflection sheet 20, the backlight tubes 30, the optical film 40, the panel 50 and the front frame 60 are stacked together in such order so as to assemble the LCD module as a whole. The back plate 10 and the front frame 60 not only are spaced apart from each other by a reserved distance for accommodating the reflection sheet 20 and the backlight tubes 30, etc., therebetween, but also are necessary to be reliably connected and fixed to each other so as to assure the ability of positioning and impact-resistance for individual portions of the LCD module.

Currently, the front frame and the back plate of the existing LCD modules can be connected to each other in two ways as described hereinafter.

The first way is engaging connection. It needs to be extra careful when the LCD modules are installed because the tolerance gap of any mating metal fasteners is very small. On the other hand, engagement does not have any effect of pre-tightening. In order to reduce any adverse effect of an impact upon the LCD panel, some thicker buffering material is usually adhesively attached to the front frame, and wider gaps are reserved at the periphery of the front frame so as to eliminate effect of manufacturing errors due to engagement. Hence, such engaging connection is time-consuming in its installation process, and results in poor resistance to impact and vibration. The LCD module also becomes thicker due to the added thickness of the buffering material.

The second way is screwing connection. When such screwing connection is adopted, the connecting process thereof is much time consuming because the screw number is higher and fixation based on screw rotation takes a certain of time. On the other hand, screwing connection is considered as one kind of rigid connection, and thus deteriorates buffering capacity of the LCD panel. Hence, thicker buffering material is necessary to be adhesively attached to the front frame so as to eliminate the adverse effect of excessive partial deformation upon the LCD panel when screws are fastened tightly. As a result, the thickness of the entire LCD module increases significantly due to such attached buffering material.

To sum up, the existing connections of the LCD module have drawbacks of complicated installation procedures, poor resistance to impact, and larger thickness of the LCD module.

Accordingly, it is imperative to provide an LCD module using a novel connection way in order to solve problems caused by existing technology.

SUMMARY OF THE INVENTION

It is a primary objective of the present invention to provide a resilient engaging member for connecting a front frame and a back plate of a liquid crystal display (LCD) module.

Another objective of the present invention is to provide a liquid crystal display (LCD) module equipped with the resilient engaging member.

In order to achieve the above objectives, the present invention discloses a resilient engaging member comprising a leaf spring and a post, wherein the leaf spring comprises connecting portions used to fix the leaf spring and stopping portions used for engagement with the post. The post comprises a body used to fix the post and a mating portion used for fixed engagement with the stopping portions. A head and a neck are disposed at an end of the mating portion, wherein the neck is located between the head and the body. The smallest dimension of the neck is smaller than a dimension of the head. The stopping portions abut against outer sides of the neck during fixing.

In an embodiment of the present invention, the stopping portions of the leaf spring are two oppositely disposed round curved recesses, a rectangular opening, or two bends each of which forms round curved shape corresponding to the post at a side thereof facing another stopping portion, and a gap is formed between the bends.

In an embodiment of the present invention, the leaf spring is two oppositely disposed tongue-like pieces.

In an embodiment of the present invention, the leaf spring further comprises a guiding portion. The guiding portion extends obliquely from the connecting portions to the stopping portions.

Furthermore, the present invention provides a liquid crystal display (LCD) module having the aforementioned resilient engaging members. The LCD module comprises a back plate, a panel, and a front frame installed in sequence. It is characterized that the LCD module further comprises a plurality of resilient engaging members.

The plurality of resilient engaging members are disposed between the back plate and the front frame and configured to connect the back plate and the front frame.

The post is fixed to the back plate or the front frame by riveting, screwing, or welding.

The leaf spring is directly formed from the back plate or the front frame by stamping, or is an independent component added to the back plate or the front frame.

Compared with the existing technical art, the present invention provides a resilient engaging member adopting resilient connection so as to have advantages of reliable connection, easy assembly, and fine resistance to any impact. An LCD module adopting the resilient engaging member of the present invention can significantly get rid of use of buffering material to apparently reduce the thickness of the entire module, and therefore comply with the technical development trend of downsizing and thinning LCD television sets.

DESCRIPTION OF THE PREFERRED EMBODIMENTS

To more clearly set forth the above-mentioned objects, features and advantages of the present invention, preferable embodiments of the present invention are given below in combination with drawings for detailed descriptions as below. Furthermore, direction-related wordings, such as 'up', 'down', 'front', 'rear', 'left', 'right', 'inside', 'outside', 'side' and so on, are used hereunder merely referring to directions of the accompanying drawings. Accordingly, the direction-related wordings are used for describing and explaining the present invention, not used for restricting the present invention. In addition, the present invention is merely exemplified by an LCD module for illustrative purpose. Respective embodiments are further described below accompanying with attached drawings.

Figure 1:
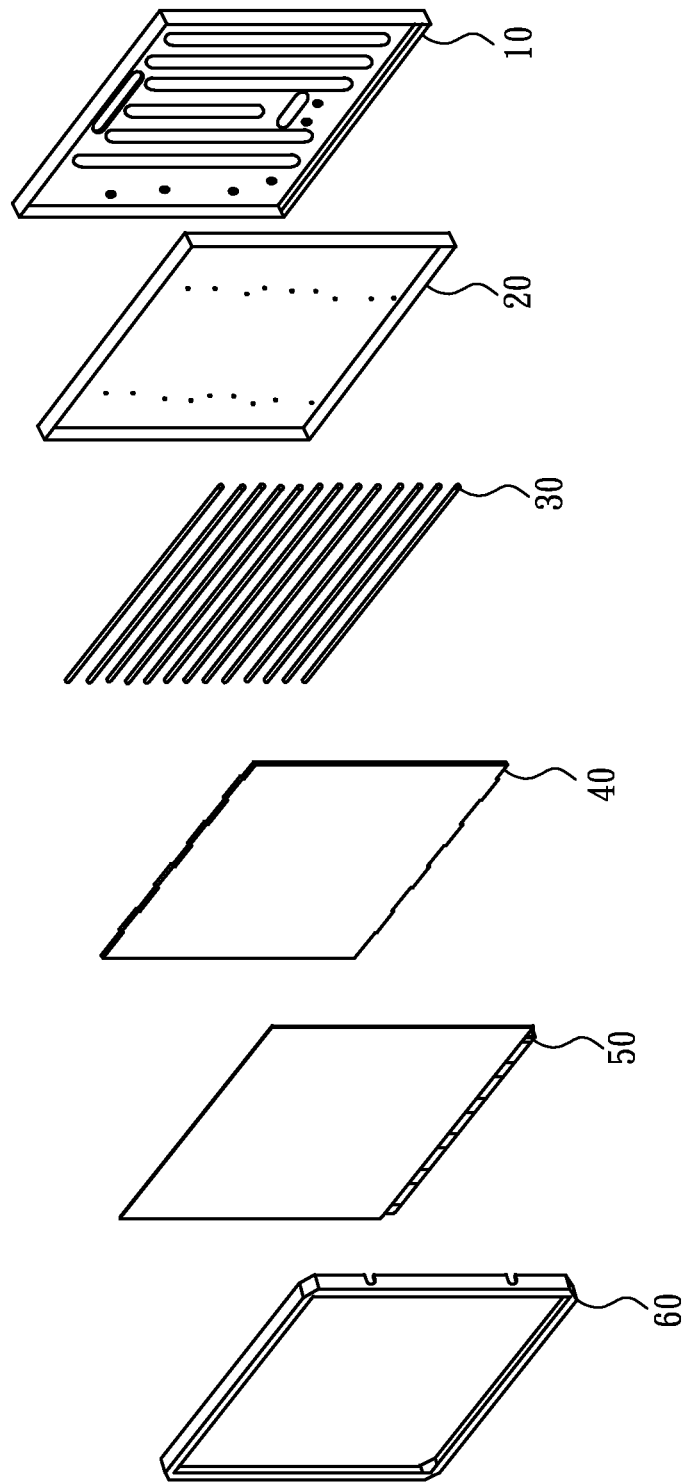
FIG. 1 is a schematic structurally exploded view of a conventionally typical liquid crystal display (LCD) module.
Figure 2:
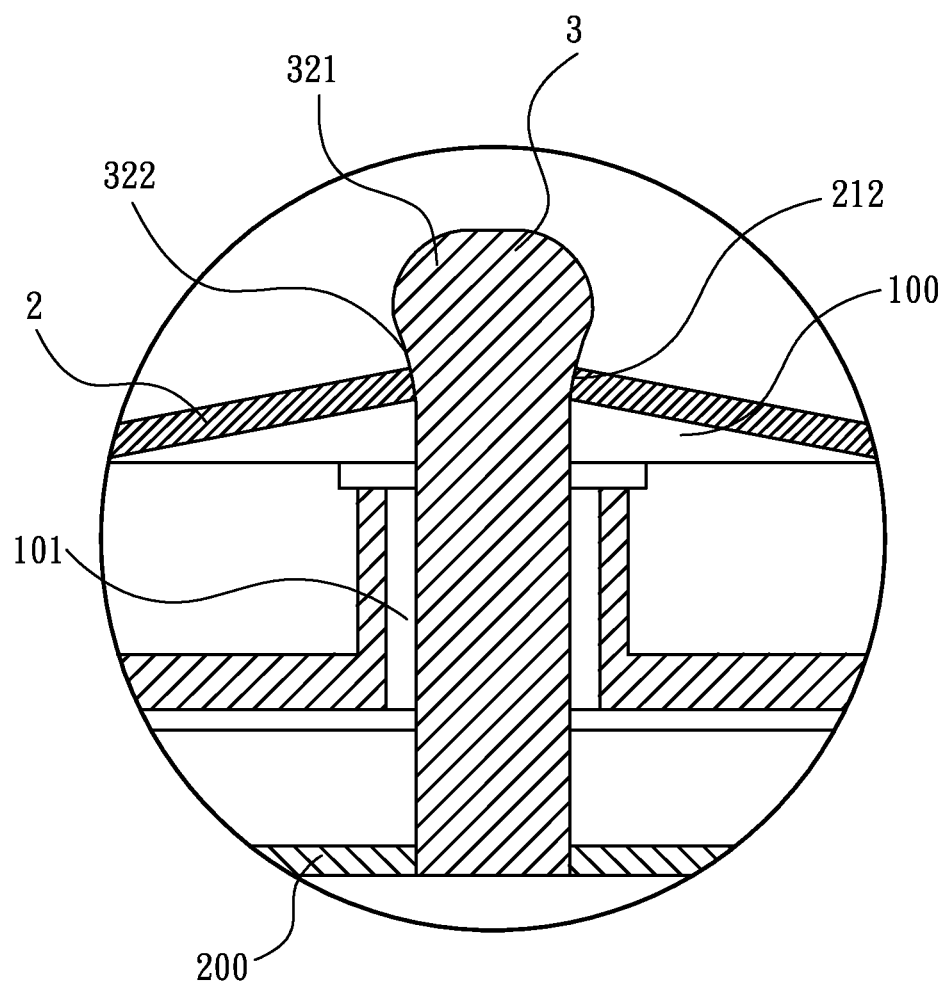
FIG. 2 is a cross-sectional view of a resilient engaging member according to a first embodiment of the present invention.

(First Embodiment) FIG. 2 is a cross-sectional view of a resilient engaging member according to a first embodiment of the present invention. The resilient engaging member of the present invention comprises a leaf spring 2 formed by two symmetrical tongue-like pieces and a post 3 having a curve mating surface 31. The curve mating surface 31 of the post 3 can be either a part of a spherical portion of the post 3 or any curve shape facilitating a head 321 of the post 3 to pass through the leaf spring 2, depending on actual using situations. In this embodiment, the mating surface 31 is exemplified merely as being spherical.

Figure 3:
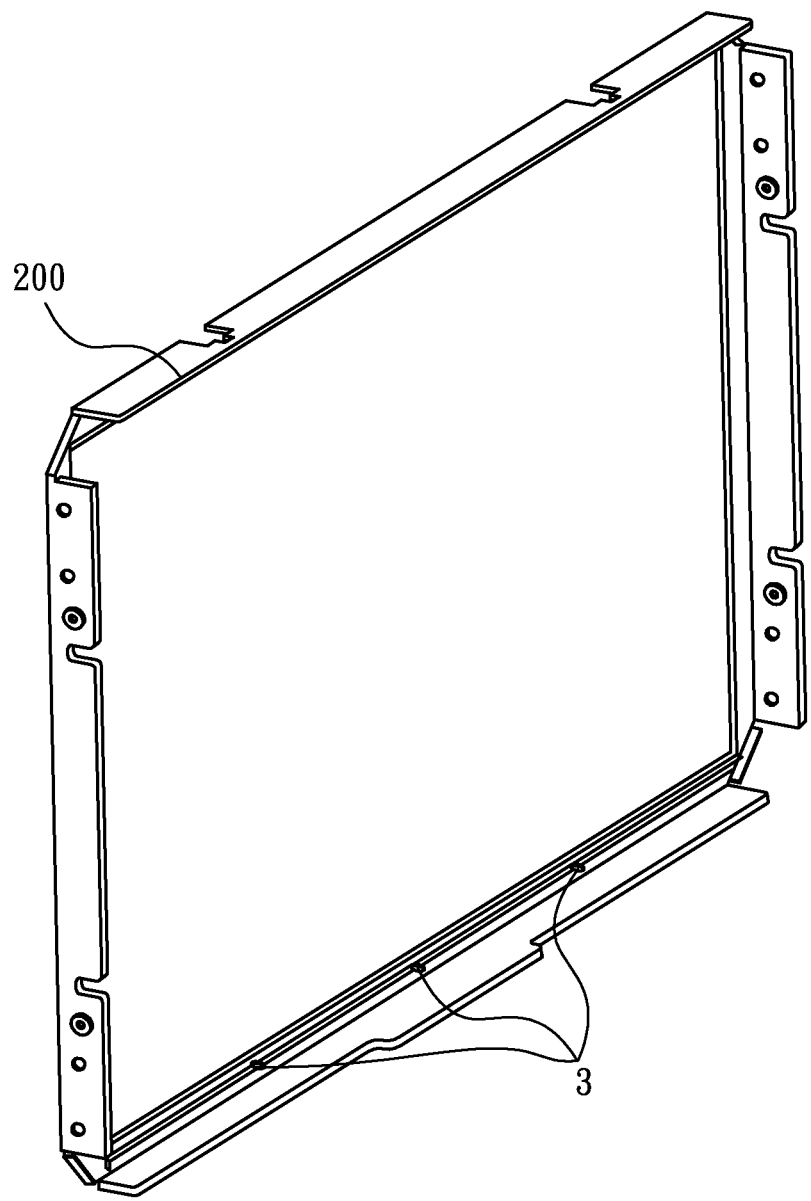
FIG. 3 is a perspective view of a front frame using the resilient engaging member shown in FIG. 2.
Figure 5:
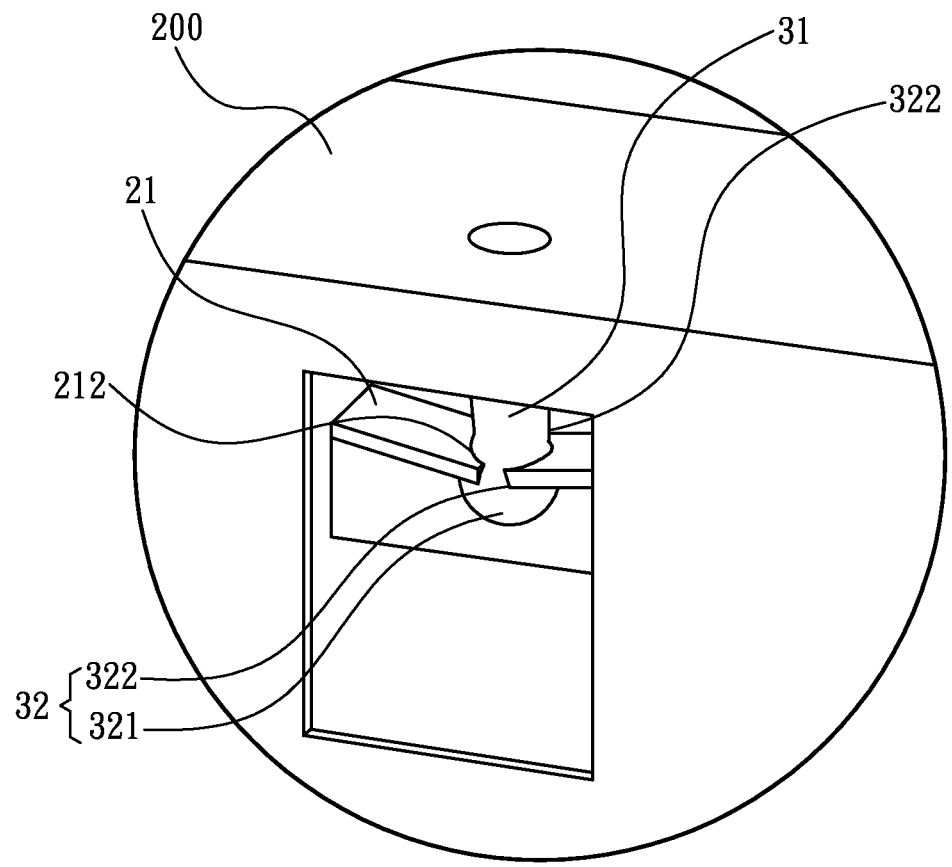
FIG. 5 is a partial enlarged schematic view of the resilient engaging members disposed on left and right sides of the front frame shown in FIG. 4A.

FIG. 3 is a perspective view of a front frame 200 using the resilient engaging member shown in FIG. 2. The post 3 comprises a body 31 used to fix the post 3 to the front frame 200, and a mating portion 32 for engagement with stopping portions 212 of the leaf spring 2. As shown in FIG. 5, the body 31 is fixedly attached to the front frame 200, and is perpendicular to an installation surface (i.e., the surface of the front frame 200 to mate with a back plate 100 of the LCD module) and extends upward into a through hole 101 of the back plate 100. The post 3 can be either a cylinder or a polyhedron prism so as to correspond to the shape of the through hole 101.

Figure 4A:
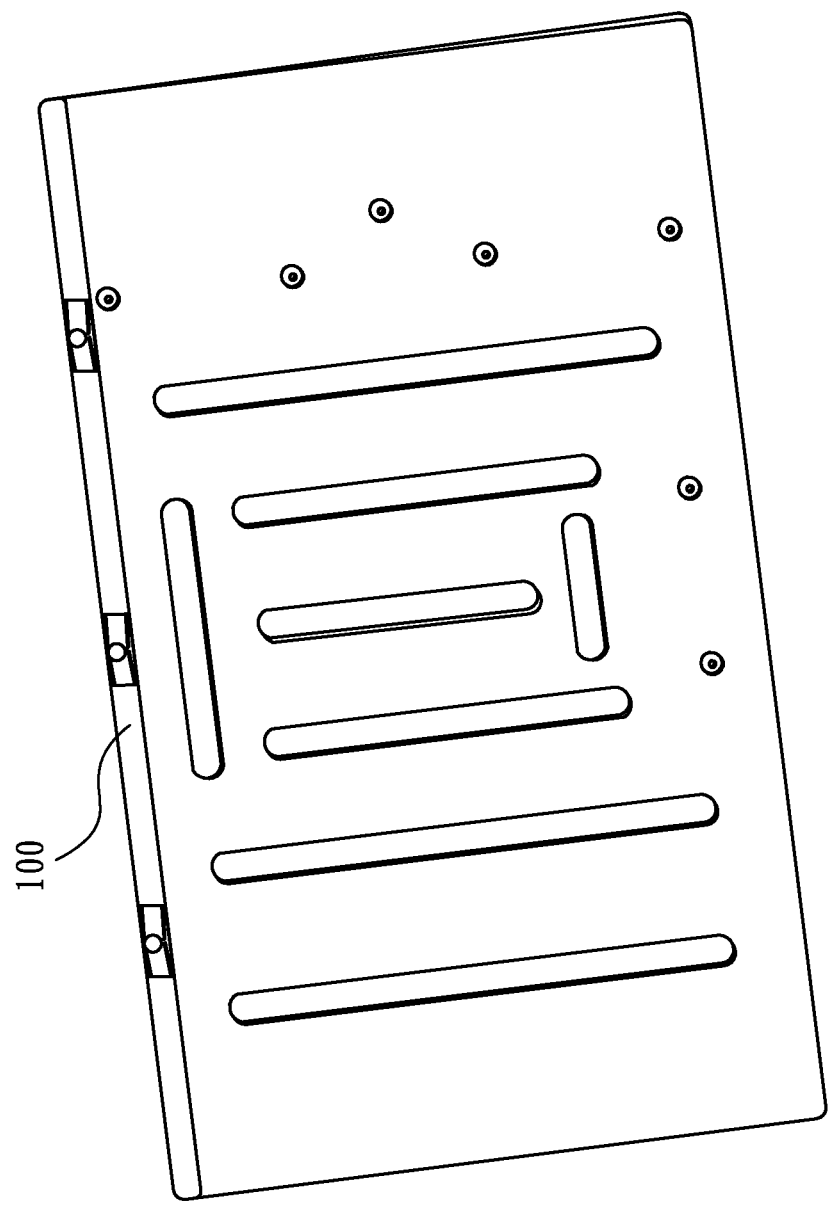
FIG. 4A is a schematic view of an LCD module having the resilient engaging member shown in FIG. 2.
Figure 4B:
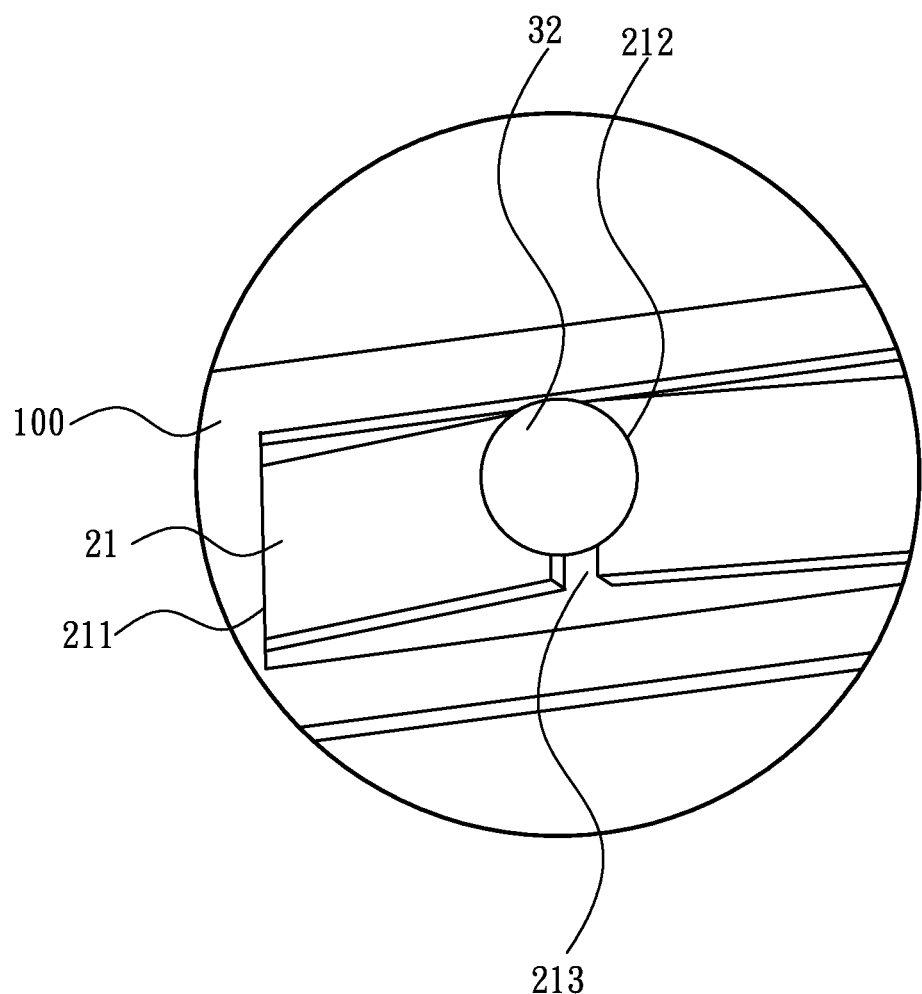
FIG. 4B is a partial enlarged schematic view of the resilient engaging members disposed on upper and lower sides of the front frame shown in FIG. 4A.

In this embodiment, the leaf spring 2 is a resilient clamp connected with the back plate 100, and made of resilient material and integrally formed from the back plate 100 by stamping. The embodied shape of the back plate 100 is shown in FIG. 4A, which discloses an LCD module having the resilient engaging member shown in FIG. 2. FIG. 4B is a partial enlarged schematic view of the resilient engaging members disposed on upper and lower sides of the front frame 200 shown in FIG. 4A. An opening and two symmetrical tongue-like pieces 21 located inside the opening are stamped from the back plate 100. A connecting portion 211 is formed at one end of each piece 21 to connect to side walls of the opening, and a stopping portion 212 having a round curved recess is formed at the other end of each piece 21 (integrally formed with each piece 21 by stamping). In this embodiment, the two stopping portions 212 of the two pieces 21 are respectively engaged with the post 3 via their round curved recesses at the ends of the two pieces 21 facing each other so as to be against and fix the post 3 (details described below). In other words, the stopping portions 212 suspend at the center of the opening located on the back plate 100 and a gap 213 is formed between the stopping portions 212. A dimension of the gap 213 is smaller than a dimension of a neck 322 of the post 3 (details described as below), and therefore the stopping portions 212 can apply a certain of pressure against the neck 322.

The mating portion 32 is disposed at an end of the post 3 away from the front frame 200 and passes through the through hole 101 of the back plate 100 to extend between the stopping portions 212 of the leaf spring 2. A head 321 is formed at an end of the mating portion 32 away from the body 31, and a neck 322 is formed between the head 321 and the body 31 and is smaller than the head 321 in dimension. The head 321 is spherical or the like so as to facilitate the head 321 passing through the through hole 101 of the back plate 100 during installation, and further passing through the gap 213 between the stopping portions 212.

The process of installation of the leaf spring 2 and the post 3 is described hereunder.

Referring to FIG. 3, eight posts 3 are installed at the front frame 200, wherein three of them are located at the upper side of the front frame 200, three of them are at the lower side of the front frame 200, one of them is at the left side of the front frame 200, and one of them is at the right side of the front frame 200. All of the posts 3 extend backward and perpendicularly to the panel of the front frame 200 from sides of the front frame 200, i.e., the heads 321 of the posts 3 are located behind the front frame 200.

As aforementioned, each post 3 fixedly attached to the front frame 200 is pressed into the corresponding through hole 101 of the back plate 101 in a way of pointing its head 321 toward the through hole 101 (even the larger-sized head is able to pass through the through hole 101). Afterwards, the head 321 protrudes out of the through hole 101 to correspond the body 31 to the through hole 101. Subsequently, the top of the head 321 contacts with the pieces 21. Since the dimension of the head 321 is larger than the dimension of the gap 213 between the stopping portions 212, the top of the head 321 moves upward and against the pieces 21 so as to lift the stopping portions 212 apart and increase the dimension of the gap 213. By way of the stopping portions 212 being lifted, the pieces 21 are shaped as guiding means which tilt downward from the stopping portions 212 to the connecting portions 211. As a result, under guidance of the pieces 21, the top of the head 321 can slide within the gap 213 smoothly even in presence of an error of assembly, and thus the assembly process is simplified. Referring to FIG. 5, which is a schematic view of installation of the resilient engaging member. The head 321 protrudes from the widen gap 213 to allow the neck 322 staying within the gap 213. Because the neck 322 is sized smaller than the head 321 and the pieces 21 possess downward resilience under their condition of being shaped as the guiding means, the stopping portions 212 of the pieces 21 will slide downward from the head 321 to the neck 322 under their restoring force, and fixedly engaged at two sides of the neck 322 via their recesses. As aforementioned, the gap 213 is sized smaller than the neck 322, and thus the pieces 21 possess certain resilience when they fixedly engage with the neck 322. In other words, the pieces 21 press against the neck 322 so as to generate pre-tightening forces between the leaf spring 2 and the post 3 and resiliently connect the back plate 100 to the front frame 200. Consequently, the LCD module having the resilient engaging member is formed. Due to such resilient connection, the present invention has an advantage of fine resistance to any impact.

Accordingly, a resilient mechanism which is easy to get in but difficult to get out and has a resilient holding tension is formed between the leaf spring 2 and the post 3, and the front frame 200 and the back plate 100 are reliably connected to each other. To disassemble them, it simply needs to pry the leaf spring 2 slightly with a tool, and the head 321 of the post 3 will be separated from the leaf spring 2.

To assemble the front frame 200 and the back plate 100, it only needs to push the front frame 200 toward and against the back plate 100. Once the front frame 200 and the back plate 100 reach a predetermined distance therebetween, the leaf spring 2 will orient and automatically guide the post 3 at the front frame 200 to an intended position of the post 3. Accordingly, the present invention has advantages of simple and reliable installation.

With the head 321 being tightly held by the leaf spring 2, the resilient mechanism has a buffering effect along a direction perpendicular to the LCD panel. Hence, the present invention has advantages of thinning or eliminating any resilient buffering material of the front frame 200 so as to effect protection to the LCD panel and thickness reduction for the LCD module.

The aforesaid connection is applicable to various backlight source LCD modules.

Understandably, in this embodiment, the tongue-like pieces 21 are integrally formed and connected to the back plate 100 by stamping. Alternatively, the connecting portions 211 of independently-formed pieces 21 can be fixed to the installation surface of the back plate 100 by riveting or screwing. Likewise, although the body 31 of the post 3 is connected to the front frame 200 by screwing, persons skilled in the ordinary art can understand that the post 3 and the front frame 200 also can be connected by riveting or welding, etc. Furthermore, although the head 321 is spherical or the like, the head 321 may also be a prism with round curved sides (such round curved sides help not only facilitating insertion of the head 321 into the gap 213, but also providing sufficient resilience so as to fix the back plate 100 and the front frame 200 together with the stopping portions 212) or other appropriate shapes.

Certainly, the leaf spring 2 of the present invention can be formed at the back plate 100 beforehand, or can also be formed or connected in advance at the front frame 200. Likewise, the post 3 can be fixedly attached to the front frame 200 beforehand, or can also be formed or connected in advance at the back plate 100.

(Second Embodiment) For the sake of convenient descriptions, the same parts and components in the first embodiment and the second embodiment will use the same references and the same names, and detailed descriptions thereof will be hereby omitted.

Figure 6:
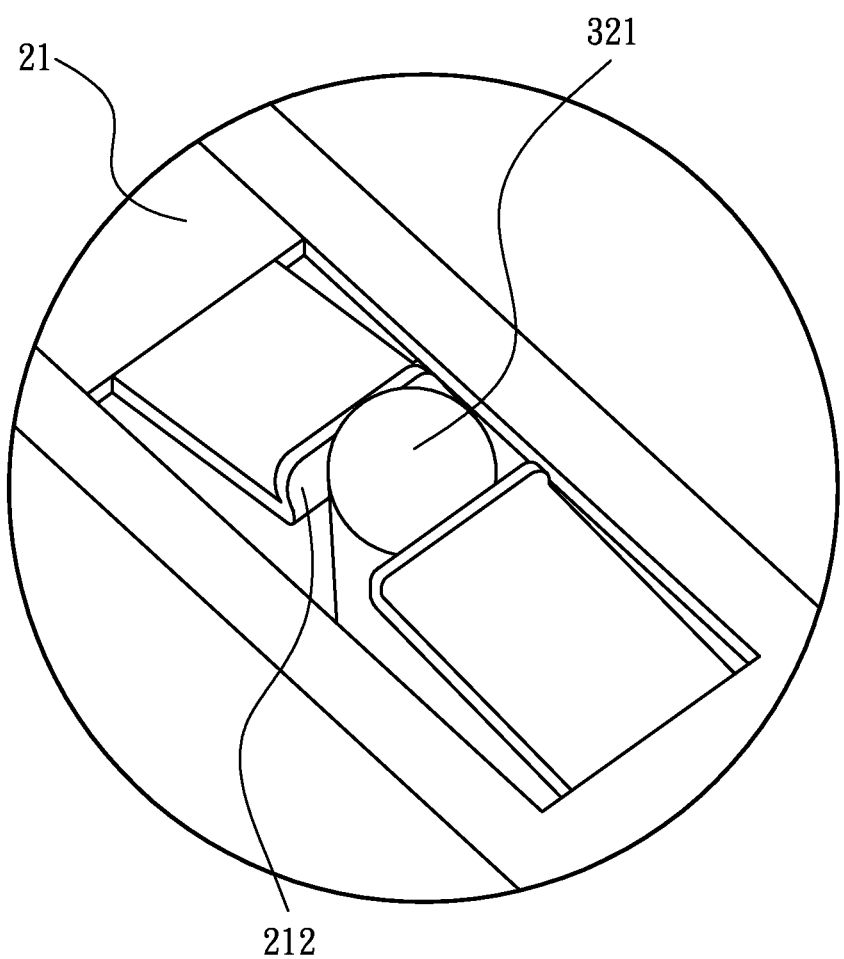
FIG. 6 is a schematic perspective view of a resilient engaging member to be installed according to a second embodiment of the present invention.
Figure 7:
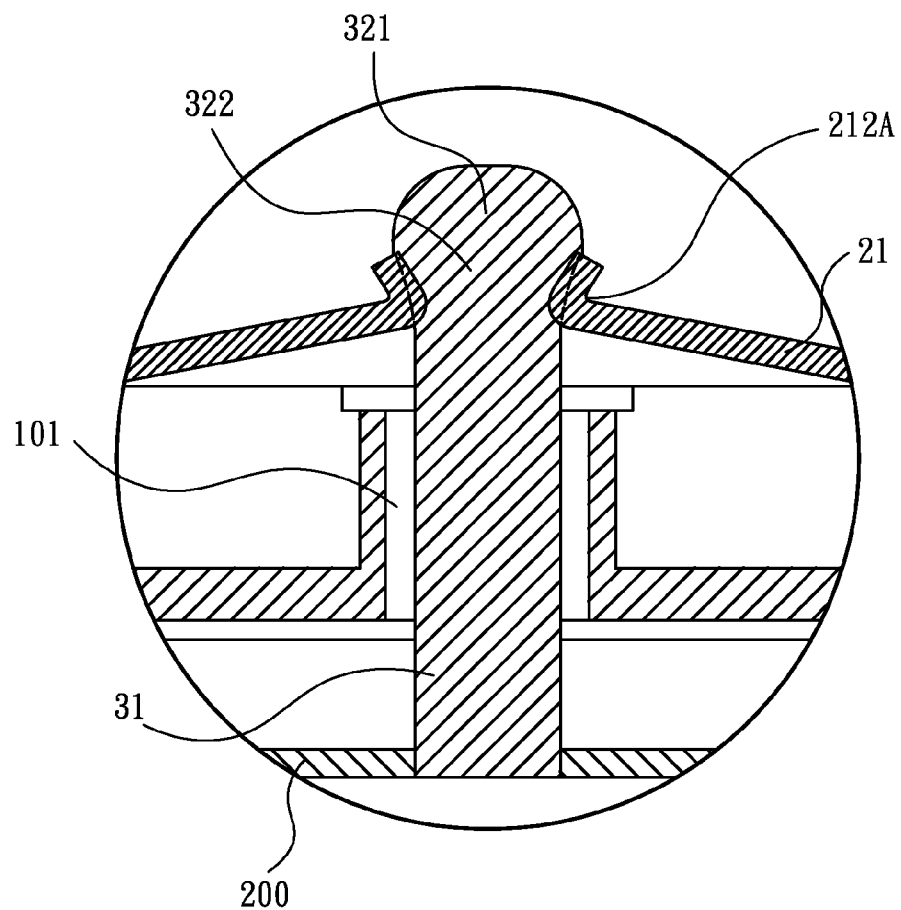
FIG. 7 is a schematic cross-sectional view of the resilient engaging member shown in FIG. 6.

Referring to FIG. 6 and FIG. 7, wherein FIG. 6 is a schematic perspective view of the resilient engaging member to be installed according to a second embodiment of the present invention, and FIG. 7 is a schematic cross-sectional view of the resilient engaging member shown in FIG. 6. The resilient engaging member of the present invention comprises a symmetrically shaped leaf spring 2 and a post 3 having a curve mating surface 31. The curve mating surface 31 of the post 3 can be either a part of a spherical portion of the post 3 or any curve shape facilitating a head 321 of the post 3 to pass through the leaf spring 2 for being fixed. In this embodiment, the mating surface 31 is merely exemplified as being spherical.

In this embodiment, the leaf spring 2 is a resilient structure which is integrally formed from the back plate 100 by stamping. A connecting portion 211 is formed at one end of each tongue-like piece 21 of the leaf spring 2 to connect to side walls of the aforesaid opening of the back plate 100, and a stopping portion 212 having a round curved bend is formed at the other end of each piece 21 (integrally formed with each piece 21 by stamping). In this embodiment, the two stopping portions 212 of the two pieces 21 of the leaf spring 2 are respectively engaged with the post 3 via their round curved sides facing each other, and the shape of the bend of each stopping portion (hook-like) corresponds to the post 3 as well so as to be against and fix the post 3. In other words, the stopping portions 212 suspend at the center of the opening located on the back plate 100 and a gap 213 is formed between the bends of the stopping portions 212. A dimension of the gap 213 is smaller than a dimension of a neck 322 of the post 3, and therefore the stopping portions 212 can apply certain pressure against the neck 322.

The process of installation of the leaf spring 2 and the post 3 in the second embodiment is similar to the first embodiment, and therefore details are hereby omitted. For the sake of convenient descriptions, the same parts and components in the first embodiment and the second embodiment will use the same references and the same names, and detailed descriptions thereof will be hereby omitted.

(Third Embodiment) For the sake of convenient descriptions, the same parts and components in the first embodiment and the third embodiment will use the same references and names, and detailed descriptions thereof will be hereby omitted.

In the first and second embodiments, the leaf spring 2 is directly formed on the back plate 100 by stamping. Alternatively, the leaf spring 2 of this embodiment is an independent prefabricated component, i.e., the leaf spring 2 is additionally installed onto the front frame 200 or the back plate 100.

Figure 8:
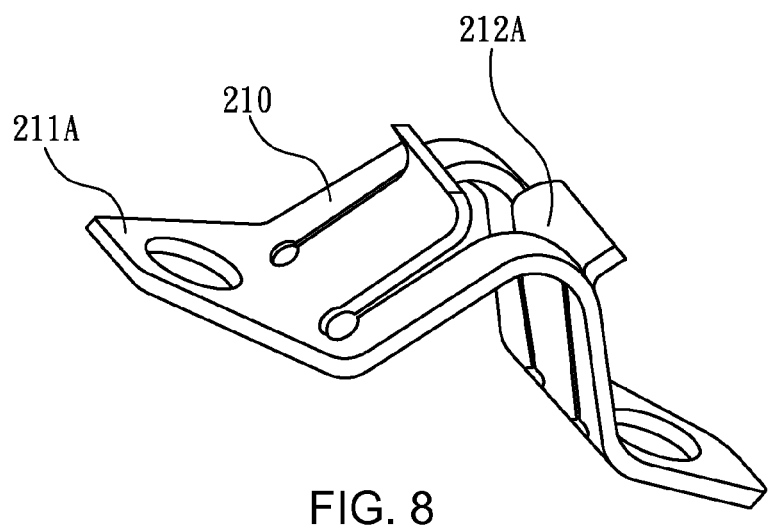
FIG. 8 is a schematic perspective view of a leaf spring according to a third embodiment of the present invention.

FIG. 8 is a schematic perspective view of the leaf spring 2 according to a third embodiment of the present invention. As shown in FIG. 8, the leaf spring 2 is made by resilient material such as metal, and comprises two symmetrical coplanar connecting portions 211A, a guiding portion 210 disposed between the connecting portions 211A, and stopping portions 212A respectively disposed at far sides of the guiding portion 210 away from the connecting portions 211A.

The connecting portions 211A can be of any shape as long as the leaf spring 2 is able to be reliably installed to the back plate 100. Connection of the leaf spring 2 to the back plate 100 can be any usual way, such as aforementioned welding or riveting.

The guiding portion 210 tilts smoothly at a specific gradient from the inner sides of the two connecting portions 211A (the sides of the connecting portions 211A facing each other)

to a height corresponding to the height of the post 3 so as to effectuate guidance thereof on the post 3 to the stopping portions 212A.

Each stopping portion 212A has a round curved bend, of which a side thereof facing another stopping portion 212A has a round curved shape to match with the post 3. Besides, the bends of the stopping portions 212 (hook-like) are shaped correspondingly to the post 3 so as to abut against and fix the post 3.

Persons skilled in the same art can understand that the stopping portions 212A in the third embodiment can be different from the aforementioned embodiments. In the third embodiment, only a rectangular opening is formed at the top (the upper portion) of the guiding portion 210. The length of the rectangular opening depends on resilience required for the leaf spring 2, and the width thereof depends on considerations of the need to fixedly engage with the post 3. The rectangular opening should be sized larger than the head 321 of the post 3 in its enlarged status to allow the head 321 of the post 3 passing through the rectangular opening, and sized slightly larger or smaller than the smallest dimension of the neck 322 of the post 3 but smaller than the dimension of the head 321 of the post 3 in its ordinary retracted state.

Figure 9A:
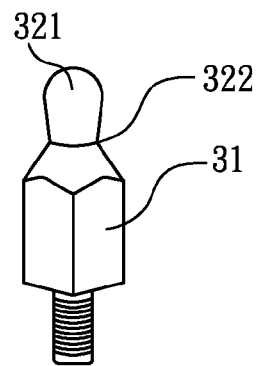
FIG. 9A is a schematic perspective view of a post according to the third embodiment of the present invention.
Figure 9B:
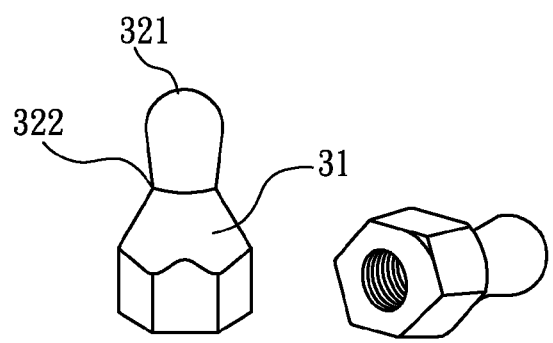
FIG. 9B is a schematic view of a modified example of the post according to the third embodiment of the present invention.
Figure 9C:
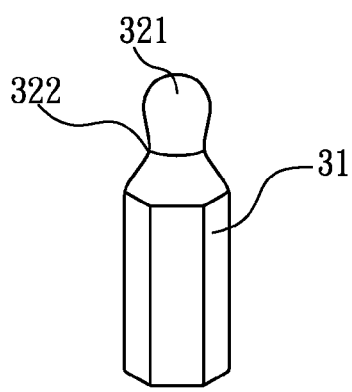
FIG. 9C is a schematic view of another modified example of the post according to the third embodiment of the present invention.

Please refer to FIGS. 9A, 9B, and 9C, wherein FIG. 9A is a schematic perspective view of a post according to the third embodiment of the present invention, FIG. 9B is a schematic view of a modified example of the post according to the third embodiment of the present invention, and FIG. 9C is a schematic view of another modified example of the post according to the third embodiment of the present invention. As shown, the head 321 of the post 3 is spherical, and the neck 322 is gradually thinned from the head 321 to its smallest dimension, and then thickened gradually to a shape thereof for smoothly connecting with the body 31, i.e., the shape of two oppositely placed round bases.

In addition, as shown in FIG. 9A, the portion of the body 31 away from the head 321 has an external screw thread structure configured for connection with the front frame 200. As shown in FIG. 9B, the body 31 has an inner screw thread structure therein for connection with the front frame 200. As shown in FIG. 9C, the body 31 has a riveting structure or a screwing threaded surface coated with an adhesive for preventing from loosening.

During the installation process, the front frame 200 is moved toward the back plate 100, and the head 321 of the body 31 contacts with the guiding portion 210 at the first place. Under guidance of the guiding portion 210, the head 321 slides along the guiding portion 210 and moves toward the stopping portions 212A. Since the dimension of the head 321 is larger than the gap between the stopping portions 212A (the rectangular opening), the head 321 pushes the leaf spring 2 backward. As a result, the leaf spring 2 made of resilient material deforms accordingly to enlarge the rectangular opening. In the condition that dimensional difference between the head 321 and the stopping portions 212A is not significant, the head 321 can penetrate and pass through the enlarged stopping portions 212A (the rectangular opening). Afterwards, the stopping portions 212A restore their original dimensions and slide along the neck 322 toward the smallest dimension portion of the neck 322. Because the dimension of the stopping portions 212A (the rectangular opening) is slightly smaller than the smallest dimension of the neck 322, the stopping portions 212A are fixedly engaged onto the smallest dimension portion of the neck 322 by certain pre-tightening forces.

As aforementioned, the resilient engaging member provided by the present invention has advantages of reliable connection, easy assembly, and high resistance to any impact, etc. LCD modules adopting the resilient engaging member of the present invention can significantly get rid of use of buffering material to apparently reduce the thickness of the entire module, and therefore comply with the technical development trend of downsizing and thinning LCD television sets.

The present invention has been illustrated and described in detail by the preferred embodiments thereof, while the above mentioned embodiments of the present invention are only examples of the present invention. It is required to point out that the present invention should not be limited in scope to the disclosed embodiments as illustrated. By contrast, all modifications and equivalents which are covered within the spirit and realm of the present invention are within the scope as defined in the appended claims.

What is claimed is:

1. A liquid crystal display (LCD) module comprising a back plate, a panel, and a front frame installed in sequence, characterized in that: the LCD module comprises:
   a plurality of resilient engaging members disposed between the back plate and the front frame and configured to connect the back plate and the front frame, each of the plurality of resilient engaging members comprising a leaf spring and a post, the leaf spring comprising connecting portions used to fix the leaf spring and stopping portions used for engagement with the post;
   the post comprising a body used to fix the post and a mating portion used for fixed engagement with the stopping portions, a head and a neck disposed at an end of the mating portion, wherein the neck is located between the head and the body, and the smallest dimension of the neck is smaller than a dimension of the head; and
   the stopping portions of the leaf spring abutting against outer sides of the neck during fixing;
   wherein each of the stopping portions of the leaf spring forms a bend having a round curved shape corresponding to the post at a side thereof facing another stopping portion, and a gap is formed between the bends; and the leaf spring further comprises a guiding portion disposed between the connecting portions and extending obliquely from the connecting portions to the stopping portions, and the stopping portions respectively disposed at far sides of the guiding portion away from the connecting portions, so that the guiding portion tilts smoothly at a specific gradient from the inner sides of the two connecting portions to a height corresponding to the height of the post.

2. A liquid crystal display (LCD) module comprising a back plate, a panel, and a front frame installed in sequence, characterized in that:
   the LCD module further comprises a plurality of resilient engaging members disposed between the back plate and the front frame and configured to connect the back plate and the front frame, each of the plurality of resilient engaging members comprising a leaf spring and a post, the leaf spring comprising connecting portions used to fix the leaf spring and stopping portions used for engagement with the post; and
   the post comprises a body used to fix the post and a mating portion used for fixed engagement with the stopping portions, a head and a neck are disposed at an end of the mating portion, wherein the neck is located between the head and the body, and the smallest dimension of the neck is smaller than a dimension of the head, and the stopping portions of the leaf spring abut against outer sides of the neck during fixing; and wherein the leaf spring further comprises a guiding portion disposed between the connecting portions and extending obliquely from the connecting portions to the stopping portions, and the stopping portions respectively disposed at far sides of the guiding portion away from the connecting portions, so that the guiding portion tilts smoothly at a specific gradient from the inner sides of the two connecting portions to a height corresponding to the height of the post.

3. The LCD module of claim 2, characterized in that: the head of the mating portion is spherical or the like.

4. The LCD module of claim 2, characterized in that: the stopping portions of the leaf spring are two oppositely disposed round curved recesses.

5. The LCD module of claim 2, characterized in that: the stopping portions of the leaf spring are a rectangular opening.

6. The LCD module of claim 2, characterized in that: the stopping portions of the leaf spring are two bends each of which forms a round curved shape corresponding to the post at a side thereof facing another stopping portion, and a gap is formed between the bends.

7. The LCD module of claim 2, characterized in that: the leaf spring is two oppositely disposed tongue-like pieces.

8. The LCD module of claim 2, characterized in that: the post is fixed to the back plate or the front frame by one of riveting, screwing and welding.

9. The LCD module of claim 2, characterized in that: the leaf spring is directly formed from the back plate or the front frame by stamping, or is an independent component added to the back plate or the front frame.

* * * * *